United States Patent
Kobayashi et al.

(10) Patent No.: US 8,893,122 B2
(45) Date of Patent: Nov. 18, 2014

(54) VIRTUAL COMPUTER SYSTEM AND A METHOD OF CONTROLLING A VIRTUAL COMPUTER SYSTEM ON MOVEMENT OF A VIRTUAL COMPUTER

(75) Inventors: Yuji Kobayashi, Hadano (JP); Tomoki Sekiguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1396 days.

(21) Appl. No.: 12/324,911

(22) Filed: Nov. 28, 2008

(65) Prior Publication Data

US 2009/0235249 A1 Sep. 17, 2009

(30) Foreign Application Priority Data

Mar. 11, 2008 (JP) .................................. 2008-061401

(51) Int. Cl.
*G06F 9/455* (2006.01)
*G06F 11/14* (2006.01)
*G06F 11/34* (2006.01)

(52) U.S. Cl.
CPC ........ *G06F 11/3485* (2013.01); *G06F 11/1497* (2013.01); *G06F 11/348* (2013.01)
USPC ........................................................... 718/1

(58) Field of Classification Search
None
See application file for complete search history.

(56) References Cited

U.S. PATENT DOCUMENTS

| 6,802,062 | B1 | 10/2004 | Oyamada et al. |
| 7,313,637 | B2 | 12/2007 | Tanaka et al. |
| 7,900,005 | B2 * | 3/2011 | Kotsovinos et al. .......... 711/162 |
| 2005/0235068 | A1 | 10/2005 | Moriki et al. |
| 2006/0288130 | A1 * | 12/2006 | Madukkarumukumana et al. .............................. 710/22 |
| 2009/0164990 | A1 * | 6/2009 | Ben-Yehuda et al. ............ 718/1 |

FOREIGN PATENT DOCUMENTS

| JP | 64-68848 A | 3/1989 |
| JP | 10-283210 | 10/1998 |
| JP | 2004-252591 A | 9/2004 |
| JP | 2005-309553 | 11/2005 |

* cited by examiner

*Primary Examiner* — Meng An
*Assistant Examiner* — Eric C Wai
(74) *Attorney, Agent, or Firm* — Mattingly & Malur, PC

(57) ABSTRACT

A hypervisor is operated while an I/O device is not controlled by the hypervisor performs a process operation. A result of the process of the I/O device which is being concurrently operated is recorded to be capable of being reflected to the operation of the hypervisor. Therefore, a hypervisor which assigns a computer including an I/O control device controlling an I/O device, a main storage device, and a CPU as resources to each of one or more logical partitions (LPAR) and performs control, and a logging circuit recording data transmission from the I/O device to the main storage device, which is uncontrolled by the hypervisor, in response to an instruction from the hypervisor, are provided. It is possible to shorten a halt time period of an LPAR.

4 Claims, 4 Drawing Sheets

| DEVICE NUMBER 201 | MODE 202 | OFFSET 203 | MAXIMUM NUMBER OF ENTRIES 204 | NUMBER OF ENTRIES 205 |
|---|---|---|---|---|
| 0 | LOGGING MODE | 0×2000 | 100 | 2 |
| 1 | NORMAL MODE | 1 | 0 | 0 |
| ⋮ | ⋮ | ⋮ | ⋮ | ⋮ |
| ⋮ | ⋮ | ⋮ | ⋮ | ⋮ |
| n | NORMAL MODE | 0 | 0 | 0 |

| ENTRY NUMBER 301 | ADDRESS 302 | SIZE 303 |
|---|---|---|
| 0 | 0×12345600 | 0×200 |
| 1 | 0×12378900 | 0×180 |
| ⋮ | ⋮ | ⋮ |
| ⋮ | ⋮ | ⋮ |

VIRTUAL COMPUTER SYSTEM AND A METHOD OF CONTROLLING A VIRTUAL COMPUTER SYSTEM ON MOVEMENT OF A VIRTUAL COMPUTER

CLAIM PRIORITY

This application claims priority from Japanese patent application, JP 2008-061401 filed on Mar. 11, 2008, the content of which is hereby incorporated by reference into this application.

BACKGROUND OF THE INVENTION

The present invention relates to a virtual computer system and a method of controlling the same. In particular, the present invention relates to a control technique that moves an operating system (virtual computer) operating on a virtual computer system on a physical computer to a virtual computer system on another physical computer.

As the number of servers increases, the complexity related to the operation of a computer system increases and the operational cost becomes an issue. Server integration, which integrates plural servers into one, has recently been focused on as a technology for reducing operational cost. Virtual computers, in which one computer is logically divided by an arbitrary ratio, are known as a technology for achieving server integration. A physical computer is divided into plural logical partitions (hereinafter, referred to as LPAR) by firmware such as a hypervisor (or middleware), and computer resources (a CPU, a main storage device, and an I/O device) are assigned to each of the LPARs, thereby realizing virtual computers which each operate a corresponding operating system on a corresponding LPAR. As a result, a CPU is time-divided, which makes flexible server integration possible. An example of such a virtual computer is disclosed in JP-A-2005-309553.

Further, in order to allow for an increase in a usage rate of physical computer resources, maintenance of physical computer hardware, etc., an operating system (virtual computer), which is operating, can be moved between plural virtual computer systems on a physical computer, which improves the flexibility of a system operation. An example of such a virtual-computer moving method is disclosed in JP-A-1998-283210.

SUMMARY OF THE INVENTION

There is a case in which an I/O device is assigned to an LPAR to occupy the LPAR, in order to prevent a hypervisor from interrupting an I/O device (to operate an I/O device not controlled by a hypervisor) to prevent a decrease in the access performance. The I/O device operates according to an instruction from an operating system which operates on the LPAR. In this case, since DMA (direct memory access) transmission from the I/O device cannot be controlled by the hypervisor, for example, it is required to make the LPAR stop during a movement process of the LPAR, in order to stop a new process demand of the I/O device, to wait for the end of the ongoing DMA transmission from the I/O device, and to start the movement process of the LPAR. For this reason, the time period during which the LPAR is stopped becomes long. Therefore, timeout of the time standby may be detected in the operating system on the LPAR.

According to the present invention, in order to shorten the temporary stop time period of the LPAR, the process operation by the I/O device that is not controlled by the hypervisor is performed while the operation of the hypervisor is performed, and the result of the process by the I/O device operating thereof is recorded to be capable of being reflected in the operation of the hypervisor.

According to one aspect of the present invention, a virtual computer system includes: a hypervisor assigning a computer, which includes an I/O control device controlling an I/O device, a main storage device, and a CPU as resources, to each of one or more logical partitions (LPAR), and performing control; and a logging circuit uncontrolled by the hypervisor and recording data transmission from the I/O device to the main storage device in response to an instruction from the hypervisor.

According to another aspect of the present invention, a method of controlling a virtual computer system is performed by a hypervisor that assigns a computer, which includes an I/O control device controlling an I/O device, a main storage device, and a CPU as resources, to each of one or more logical partitions, which controls each of the one or more logical partitions, and instructs a logging circuit to record data transmission from the I/O device to the main storage device according to an instruction from an operating system operating on each of the one or more logical partitions.

According to a further aspect of the present invention, the logging circuit is instructed to record data transmission from the hypervisor as a part of a process of moving the logical partition to another logical partition which another hypervisor assigns resources of another computer to and controls.

According to another aspect of the present invention, the logging circuit records the data transmission from the I/O device to the main storage device during performing the process that moves the logical partitions by the hypervisor.

Moreover, in this specification, the term "movement" is used as in the movement process of the logical partition (LPAR) and is used when resources assigned to a logical partition are reproduced in another logical partition which is a movement destination. In particular, there is a case in which the contents of a logical main storage assigned to a logical partition, which is a movement origin, are "copied" to a movement destination and the contents of the logical main storage copied to the movement destination are modified into a new logical partition, as a "transition" case, in which the contents of the logical main storage assigned to the movement origin are copied to the movement destination, that is, a process by a virtual computer in the logical partition where the movement destination restarts, and a process in the logical partition where the movement origin is finished, etc.

According to the present invention, the operation of the hypervisor and the process operation by the I/O device, which is not controlled by the hypervisor, are performed in parallel, and the result of the process by the parallelly operated I/O device is recorded to be capable of being reflected in the operation of the hypervisor, thereby making it possible to reduce the temporary stop time period of the LPAR (an operating system which operates on the LPAR).

BRIEF DESCRIPTION OF THE DRAWINGS

FIG. 2 is a diagram illustrating an example of a control register for controlling a logging circuit;

FIG. 3 is a diagram illustrating an example of a DMA transmission situation recording area;

DETAILED DESCRIPTION OF THE PREFERRED EMBODIMENTS

Hereinafter, an exemplary embodiment of the present invention will be described with reference to the accompanying drawings.

Figure 1:
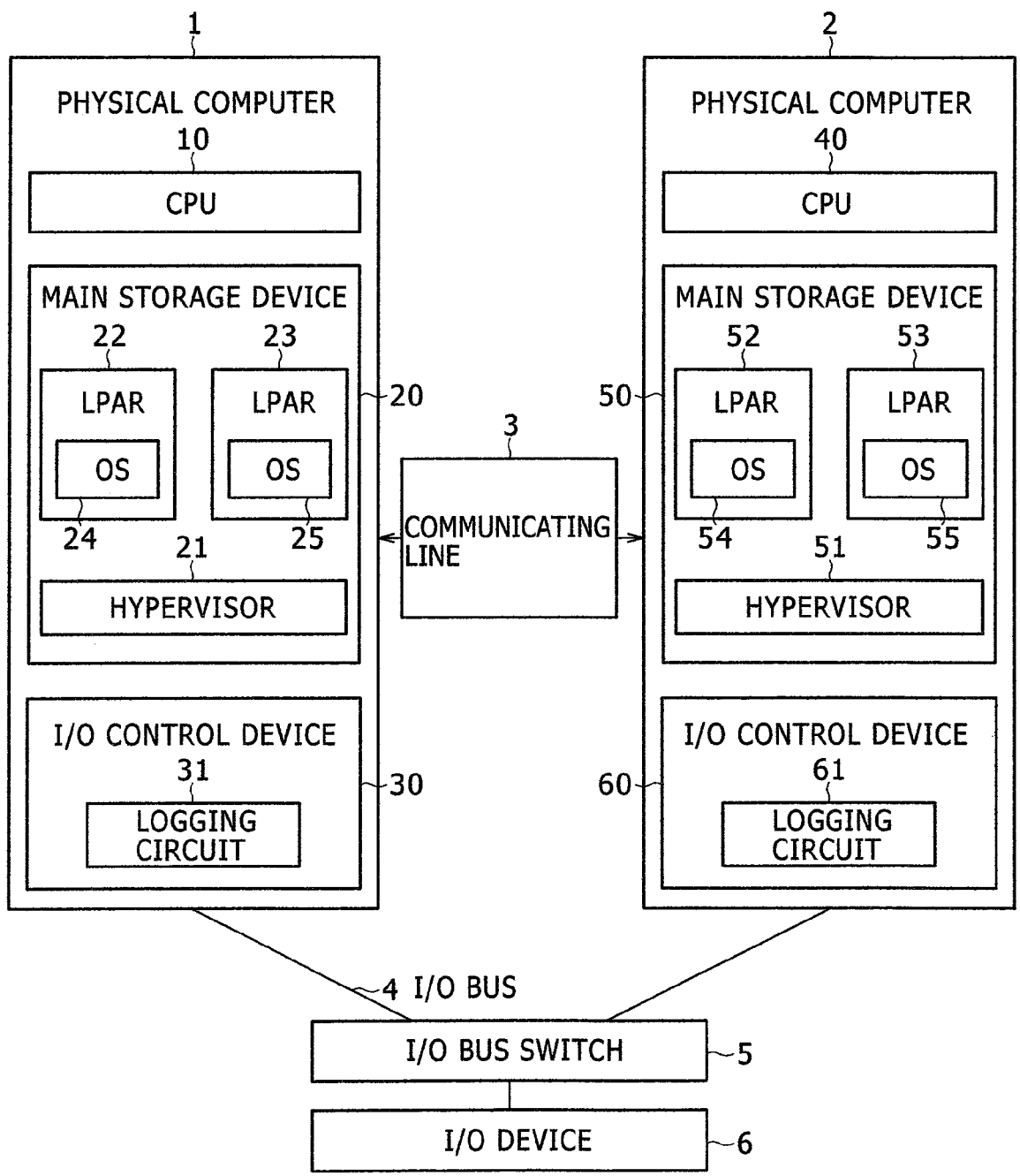
FIG. 1 is a block diagram illustrating a structure of a virtual computer system.

FIG. 1 is a block diagram illustrating a virtual computer system according to an exemplary embodiment. A physical computer 1 includes a CPU (processor) 10, a main storage device 20, and an I/O (input/output) control device 30. The physical computer 1 operates a hypervisor 21 which controls a virtual computer system on the main storage device 20. The hypervisor 21 is implemented as firmware of the physical computer 1 or software which is stored in the main storage device 20 and is executed in the CPU 10. An LPAR (logical partition) 22 and an LPAR 23 are controlled by the hypervisor 21 such that an operating system 24 and an operating system 25 operate on the LPARs, respectively. Similarly, a physical computer 2 includes a CPU 40, a main storage device 50, and an I/O control device 60. The physical computer 2 also operates a hypervisor 51 on the main storage device 50. An LPAR 52 and an LPAR 53 are controlled by the hypervisor 51 such that an operating system 54 and an operating system 55 operate on the LPARs, respectively. In FIG. 1, each physical computer includes plural LPARs. However, each physical computer may include only one LPAR. The physical computer 1 is connected to an I/O device 6 through the I/O control device 30, an I/O bus 4, and an I/O bus switch 5, and the physical computer 2 is connected to the I/O device 6 through the I/O control device 60, the I/O bus 4, and the I/O bus switch 5, such that the I/O device 6 can be used in common for the physical computers. In order to simply explain the control movement of an LPAR, to be described below, a structure in which the I/O device 6 can be used in common is adapted. However, in order to move an LPAR, the same or larger number of resources may exist in a movement destination. Further, the physical computer 1 and the physical computer 2 are connected to a communicating line 3, and data transmission is performed between the hypervisors through the communicating line 3 under control of the hypervisors.

In order to ensure I/O access performance, the I/O device 6 is assigned to the LPARs 22, 23, 52, and 53 and the hypervisor 21 and 51 are not involved in the control of the I/O device 6. Control of DMA (direct memory access) transmission by the I/O device 6 is performed by an operating system on an LPAR and cannot be performed by the hypervisor 21.

The I/O control device 30 includes a logging circuit 31 which records a DMA transmission situation from the I/O device 6 to the main storage device 20, and the I/O control device 60 includes a logging circuit 61 which records a DMA transmission situation from the I/O device 6 to the main storage device 50. The logging circuit 31 and the logging circuit 61 may be realized as a hardware circuit or may be realized as software (middleware). Since a large-scale I/O control device is configured by a processing device having a CPU or a memory, it can be easily realized by software. Data transmission performed as DMA transmission includes data output from the main storage device 20 or the main storage device 50 to the I/O device 6 and data input from the I/O device 6 to the main storage device 20 or the main storage device 50. This exemplary embodiment is intended for DMA transmission regarding data input from the I/O device 6 in which data stored in the main storage device 20 or the main storage device 50 is rewritten by DMA transmission.

In addition, the logging circuit 31 and the logging circuit 61 may be provided at any position on the I/O bus extending from an operating system on an LPAR to the I/O device. However, it is preferable that they be provided in the I/O control device 30 and the I/O control device 60 capable of determining parameters for DMA transmission or performing address conversion regarding I/O.

The LPAR 22, the LPAR 23, the LPAR 52, and the LPAR 53 are computer resources obtained by virtualizing computer resources of the physical computers. Each LPAR includes a logical CPU obtained by virtualizing a corresponding CPU, assigning one of the logical main storage areas obtained by dividing a corresponding main storage device (hereinafter, the assigned logical main storage area is called a logical main storage area), and a logical I/O control device obtained by virtualizing a corresponding I/O control device, and is connected to a virtualized I/O device.

In addition, the physical computer 1 or the physical computer 2 may include only one CPU, or may include two or more CPUs. Similarly, each LPAR (the LPAR 22, the LPAR 23, the LPAR 52, or the LPAR 53) may include only one logical CPU or may include two or more logical CPUs. Moreover, the number of LPARs capable of being controlled by the hypervisor 21 or the hypervisor 51 may be arbitrary.

FIG. 2 shows an example of a structure of a control register 200 for controlling the logging circuit 31 and the logging circuit 61 from the hypervisors 21 and 51. A storage device (memory) provided in the I/O control device 30 or 60 may be used as the control register. The control register 200 includes fields of a mode 202, an offset 203, a maximum number of entries 204, and a number of entries 205 corresponding to a device number 201 of n which is the number of I/O devices controlled by the I/O control device 30 or 60, that is, n. The mode 202 represents whether to log a DMA transmission situation. The offset 203 represents a location of a buffer area (DMA transmission situation recording area) for recording the DMA transmission situation when logging is performed. The maximum number of entries 204 represents the maximum number of entries of the DMA transmission situation recording area. The number of entries 205 represents the number of available entries of the DMA transmission situation recording area (the number of available entries is the number of available entries of an area in which the DMA transmission situation has been recorded and entries are available for recording subsequent DMA transmission situations).

Both a "normal mode" and a "logging mode" may be set to the mode 202. The initial mode 202 is the "normal mode", and when the normal mode is set to the mode 202, logging is not performed. When the mode 202 is the "normal mode", the offset 203 and the maximum number of entries 204 can be set, and the offset 203 and the maximum number of entries 204 are set before the "logging mode" is set to the mode 202. When the mode 202 is changed from the "normal mode" to the "logging mode", the contents of the number of entries 205 is initialized to 0. When the mode 202 is the "logging mode", if the I/O device 6 corresponding to the device number 201 performs DMA transmission one time, the DMA transmission situation is recorded by the logging circuit 31 or 61 in as many entries as represented by the number of entries 205, of a DMA transmission situation recording area whose head location is the location represented by the offset 203, and the contents of the number of entries 205 increases by 1. When the mode 202 is changed from the "logging mode" to the "normal mode", the logging of the DMA transmission situation by the logging circuit 31 or 61 stops. Also, when the number of entries 205 reaches the number of entries designated as the maximum number of entries 204, the logging of the DMA transmission situation stops.

FIG. 3 shows an example of a structure of a DMA transmission situation recording area 300 which is a buffer area for recording a DMA transmission situation by the logging circuit 31 or 61. The DMA transmission situation recording area 300 has as many fields as the number of entries set as the maximum number of entries 204 and includes an address 302 and a size 303 corresponding to an entry number 301. The address 302 and the size 303 represent a head address and size of a storage area of the main storage device 20 or 50 of which stored data has been rewritten by DMA transmission, respectively. No matter whether the head address is an address of the main storage device or an address of a logical main storage assigned to an LPAR, the hypervisor may perform address conversion on the basis of data on assignment to the LPAR.

Moreover, the DMA transmission situation recording area 300 may be in a storage device provided inside the I/O control device 30 or 60 and may be in the main storage device 20 or 50.

Figure 4:
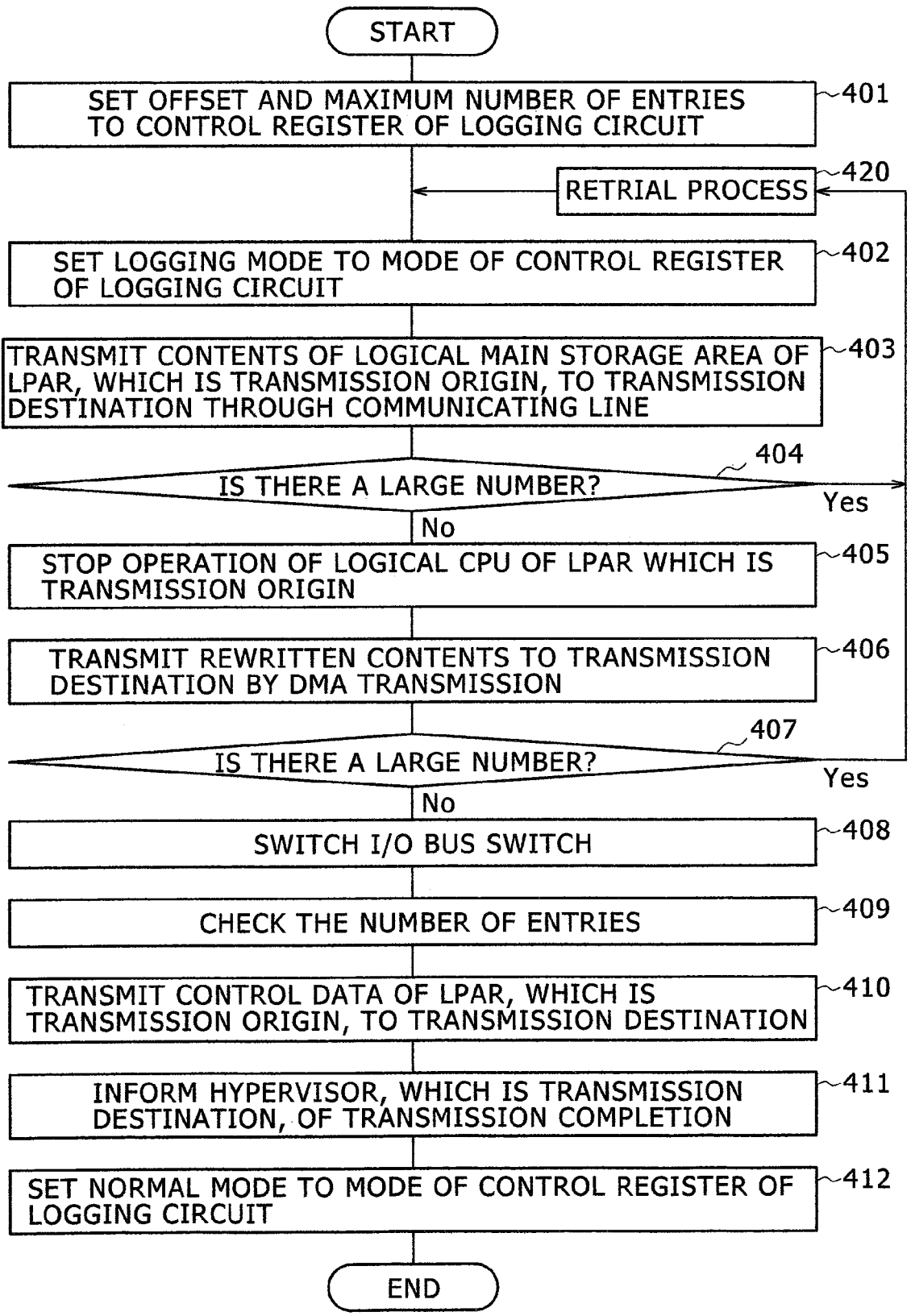
FIG. 4 is a flow chart illustrating control of movement of a storage area of an LPAR between hypervisors.

FIG. 4 is a flow chart illustrating movement control of a storage area of an LPAR between the hypervisors according to this exemplary embodiment. Hereinafter, a case of moving a logical main storage area of the LPAR 23 of the hypervisor 21 shown in FIG. 1 as a logical main storage area of the LPAR 52 of another hypervisor 51 will be described as an example. The hypervisor 21 informs the hypervisor 51 of movement control start through the communicating line 3 and starts this process, without stopping the operating system 25 (the operation of the logical CPU) on the LPAR 23. This process is a part of the process of the hypervisor 21.

The hypervisor 21 sets, to the control register 200, the offset 203 representing the location of the DMA transmission situation recording area 300 and the maximum number of entries 204 representing the maximum number of entries of the DMA transmission situation recording area 300 for every device number 201 corresponding to the I/O device 6 assigned to the LPAR 23, as an instruction to the logging circuit 31 (Step 401), initializes the number of entries 205 of the control register 200 to zero, sets the logging mode to the mode 202 (Step 402), and begins to record a DMA transmission situation.

The hypervisor 21 transmits the contents of the logical main storage area of the LPAR 23 to the logical main storage area of the LPAR 52 of the hypervisor 51 through the communicating line 3 (Step 403). During the process in Step 403, since the hypervisor 21 does not stop the operating system 25 on the LPAR 23, the contents of the logical main storage area of the LPAR 23 are changed by the logical CPU of the LPAR 23. Therefore, the hypervisor 21 detects a change in the contents of the logical main storage area of the LPAR 23 by the logical CPU of the LPAR 23 and transmits the changed contents to the logical main storage area of the LPAR 52. Since the operation of the logical CPU of the LPAR 23 is under control of the hypervisor 21, the hypervisor 21 can detect a change in the contents of the logical main storage area of the LPAR 23.

The hypervisor 21 determines whether the number of entries 205 is sufficiently smaller than the maximum number of entries 204 set for the device number 201 in Step 402 (Step 404). When the number of entries 205 is not sufficiently small for any one device number 201, the process proceeds to Step 420 which is a retrial process (to be described below), and when the number of entries is sufficiently small for all the device numbers, the process proceeds to Step 405. For implementation, it is easy to set a sufficiently small value in advance and to compare the number of entries 205 to the set value, not a ratio to the maximum number of entries 204.

The hypervisor 21 stops the operation of the logical CPU of the LPAR 23 (Step 405), and transmits the contents of the logical main storage area of the LPAR 23, which is represented by the address 302 and the size 303 of DMA transmission situation recording area 300 of a number corresponding to the number of entries 205, to the logical main storage area of the LPAR 52 (Step 406).

The transmission in Step 406 is performed in a state in which the operation of the logical CPU of the LPAR 23 is in a halt state. Therefore, as the transmission time period of Step 406 lengthens, the halt time period of the operation of the logical CPU of the LPAR 23 lengthens. The magnitude of the number of entries 205 regarding the transmission time period is determined in Step 404. Strictly, it is preferable to consider the size 303 of the logical main storage area to be transmitted for every entry. When the transmission time period depending on the size of the logical main storage area to be transmitted is sufficiently short as compared to the changeover time of the address 302 of the DMA transmission situation recording area 300 to be transmitted for every entry, all that is required is to determine the magnitude of the number of entries 205 as in Step 404.

The hypervisor 21 determines whether the number of entries 205 is sufficiently smaller than the set maximum number of entries 204 for every device number 201 set in Step 402 (Step 407). When the number of entries 205 is not sufficiently small for any one corresponding device number 201, the process proceeds to Step 420 which is a retrial process, and when the number of entries are sufficiently small for every device number, the process proceeds to Step 408.

The hypervisor 21 controls the I/O bus switch 5 to switch the connection of the I/O bus switch 5 between the physical computer 1 and the physical computer 2 (Step 408). In Step 408, the I/O bus switch 5 is separated from the physical computer 1 and the I/O bus switch 5 is connected to the physical computer 2.

The hypervisor 21 checks whether the number of entries 205 is the same as the number of entries transmitted in Step 406 for every device number 201 set in Step 402. When the number of entries is greater than the number of entries transmitted, the hypervisor transmits the contents of the logical main storage area of the LPAR 23, which is represented by the address 302 and the size 303 of the DMA transmission situation recording area 300 corresponding to the number of entries increased to the logical main storage area of the LPAR 52 (Step 409). As described, since the rewritten contents of the logical main storage area of the LPAR 23 are transmitted to the logical main storage area of the LPAR 52 during Step 406 to Step 408, it is possible to ensure that the contents of the logical main storage area of the LPAR 23 is the same as the contents of the logical main storage area of the LPAR 52.

The hypervisor 21 transmits LPAR control data, including control data of the logical CPU of the LPAR 23 and the like, to the hypervisor 51 (Step 410). Then, transmission of all data for operating the operating system 54 transmitted onto the LPAR 52 is completed, and the hypervisor 21 informs the hypervisor 51 that transmission of all data of the LPAR 23 has been completed (Step 411).

Finally, the hypervisor 21 sets the normal mode to the mode 202 of the logging circuit 31 for every device number 201 set in Step 402 (Step 412), thereby completing the transmission process of the logical main storage area of the LPAR 23.

Figure 5:
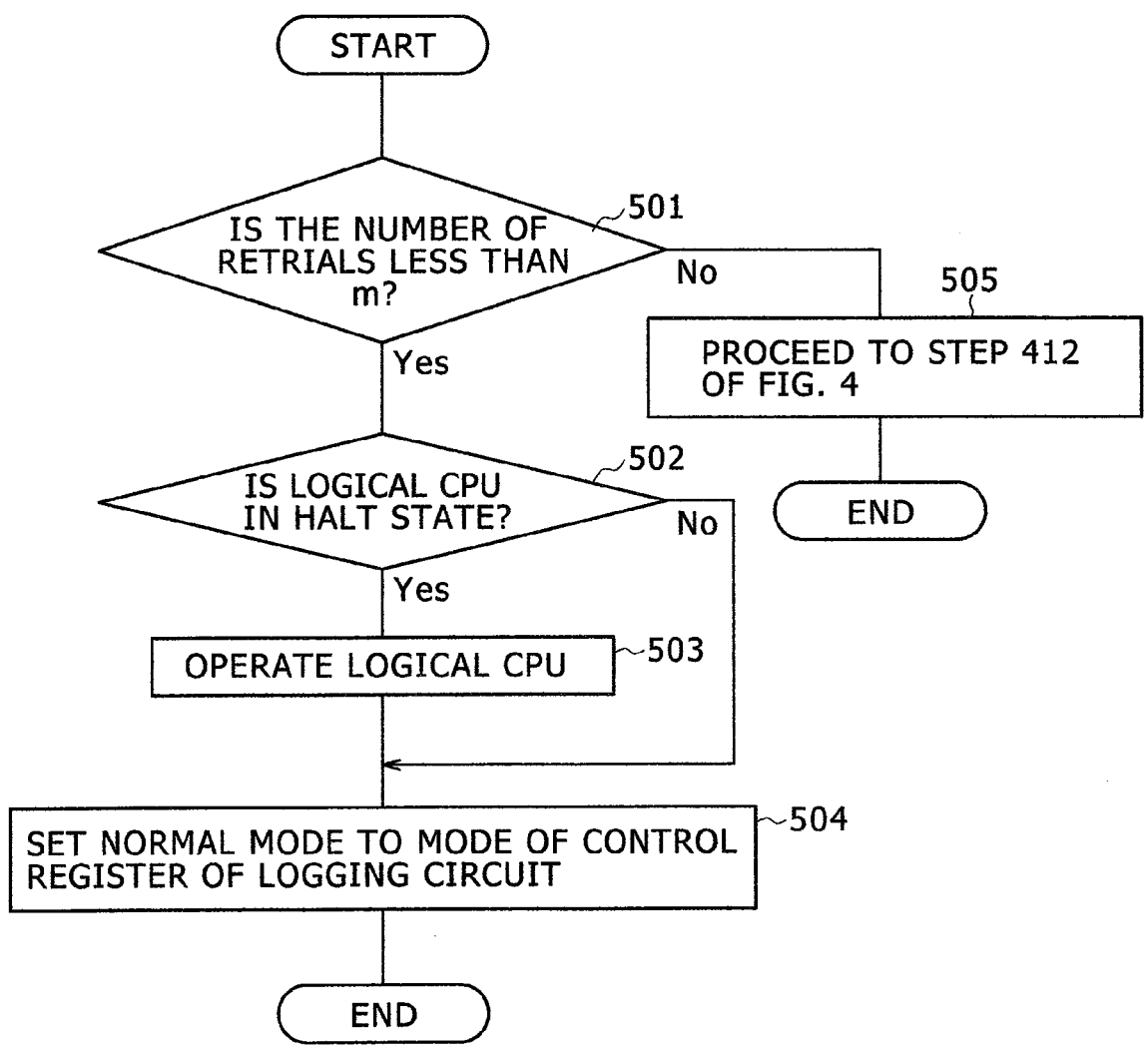
FIG. 5 is a flow chart illustrating a retrial process.

FIG. 5 shows a flow chart of a retrial process of Step 420. It is determined whether the number of retrials is less than m (Step 501). When the number of retrials is less than m, the retrial process proceeds to Step 502, and when the number of retrials is equal to or more than m, the retrial process proceeds to Step 505.

It is determined whether the logical CPU of the LPAR 21 is in a halt state (Step 502). When the logical CPU is in a temporary stop time, the retrial process proceeds to Step 503 (and from there to Step 504), and when the logical CPU is not in a temporary stop time, the retrial process proceeds to Step 504. When it is in a temporary stop time, the logical CPU of the LPAR 23 is changed from the temporary stop time to an operating state (Step 503).

The normal mode is set to the mode 202 for every device number 201 set in Step 402 (Step 504). Next, the transmission process restarts from Step 402, thereby retrying the transmission process of the logical main storage area of the LPAR. Since the process restarts from Step 402, a logging instruction of the DMA transmission situation to the logging circuit 31 is reissued (the mode 202 is changed form the "normal mode" to the "logging mode"). When there is a possibility that the process of transmitting the contents of the logical main storage area of the LPAR 23 to the logical main storage area of the LPAR 52 may fail because of an increase in the number of entries 205 according to a temporary increase in I/O access load (for example, when the number of entries 205 exceeds the value of the maximum number of entries 204 and thus the DMA transmission situation recording area 300 overflows), the process restarts from Step 402, in other words, a retrial is performed, resulting in a successful transmission process when the I/O access load is reduced. Moreover, it is possible to shorten the halt time period of the operating system 25 of the LPAR 23 by Step 501 to Step 504.

When the number of retrials is equal to or more than m, in other words, when the number of retrials exceeds limit, the process proceeds to Step 412 (Step 505). In Step 412, the transmission process of the LPAR 23 stops. In this case, after a measure is taken, for example, after the DMA transmission situation recording area 300 increases, the process is performed from Step 401 again, thereby performing the transmission process of the LPAR 23 to the LPAR 52.

According to this embodiment, even when an I/O device is assigned to an LPAR to occupy the LPAR (the I/O device is not under control of a hypervisor), LPAR movements between physical computers is possible and thus the flexibility of a system operation can be improved.

What is claimed is:

1. A computer comprising:
    an I/O control device controlling an I/O device;
    a logical partition in which an OS (Operating System) operates;
    a main storage device having a first logical storage area, which is assigned to the logical partition and stores data;
    a CPU, which is assigned to the logical partition as a logical CPU;
    a hypervisor assigning resources including the main storage device, the CPU, and the I/O device to the logical partition so that the logical partition occupies the I/O device, data being transmitted from the I/O device to the first logical storage area without interruption of the hypervisor; and
    a logging circuit which is a different entity from the hypervisor, and which has a plurality of entries,
    wherein the hypervisor is configured to send an instruction to the logging circuit and execute a first movement in which first data stored in the first logical storage area assigned to the logical partition is migrated to a second logical storage area assigned to another logical partition controlled by another hypervisor in another computer,
    wherein the logging circuit operates in parallel to the first movement to record an address and a size of second data in one of the plurality of entries per transmission of the second data, the address denoting storing positions of the second data in the first logical storage area,
    wherein during the first movement, the second data, which is transmitted from the I/O device to the first logical storage area after sending the instruction, replaces a part of the first data in the first logical storage area, and
    wherein the hypervisor is configured to:
        stop the logical CPU assigned to the logical partition during a second movement when a number of recorded entries, each including the address and the size, does not exceed a predetermined number,
        execute the second movement in which the second data, which is stored in the first logical storage area and is denoted by the address and the size recorded in at least one of the plurality of entries, is moved to the second logical storage area, the logging circuit continuing to record the address and size of the second data transmitted from the I/O device in one of the plurality of entries per transmission of the second data, and
        resend the instruction to the logging circuit and restart the logical CPU to retry the first movement when the number of recorded entries exceeds the predetermined number.

2. The computer according to claim 1, wherein the transmission of the second data is DMA (Direct Memory Access) transmission between the I/O device and the first logical storage area.

3. A method of controlling a computer which includes an I/O control device controlling an I/O device, a logical partition in which an OS (Operating System) operates, a main storage device having a first logical storage area which is assigned to the logical partition and stores data, a CPU which is assigned to the logical partition as a logical CPU, a hypervisor, and a logging circuit which is a different entity from the hypervisor and which has a plurality of entries, the method comprising:
    assigning resources including the main storage device, the CPU, and the I/O device to the logical partition so that the logical partition occupies the I/O device, data being transmitted from the I/O device to the first logical storage area without interruption of the hypervisor;
    sending an instruction to the logging circuit and executing a first movement in which first data stored in the first logical storage area assigned to the logical partition is migrated to a second logical storage area assigned to another logical partition controlled by another hypervisor of another computer, wherein the logging circuit operates in parallel to the first movement to record an address and a size of the second data in one of the plurality of entries per transmission of second data, the address denoting storing positions of the second data in the first logical storage area, wherein during the first movement, the second data, which is transmitted from the I/O device to the first logical storage area after sending the instruction, replaces a part of the first data in the first logical storage area;
    stopping the logical CPU assigned to the logical partition during a second movement when a number of recorded entries, each including the address and the size, does not exceed a predetermined number;
    executing the second movement in which the second data, which is stored in the first logical storage area and is denoted by the address and the size recorded in at least one of the plurality of entries is moved to the second logical storage area, the logging circuit continuing to record the address and size of the second data transmitted from the I/O device in one of the plurality of entries per transmission of the second data; and resending tile instruction to the logging circuit and restarting the logical CPU to retry the first movement when the number of recorded entries exceeds the predetermined number.

4. The method of controlling a computer according to claim 3, wherein the transmission of the second data is DMA (Direct Memory Access) transmission between the I/O device and the first logical storage area.

* * * * *